3,218,360
PRODUCTION OF GLYCOLS
Seymour J. Lapporte, Berkeley, Calif., assignor to California Research Corporation, San Francisco, Calif., a corporation of Delaware
No Drawing. Filed Jan. 13, 1961, Ser. No. 82,408
3 Claims. (Cl. 260—631)

The present invention relates to the preparation of vicinal glycols, such as the 1,2-glycols. More particularly, the invention has to do with the preparation of the aforesaid glycols from the corresponding vicinal chlorohydrin acetate by ammonolysis with anhydrous ammonia.

The invention is useful in the preparation of glycols, which in turn are used as intermediates in chemical syntheses, such as in the preparation of detergents, cutting oil emulsions, and surface coating alkyds. The invention is also useful in the preparation of vicinal dihydroxy steroidal compounds, such as sterols, sex hormones, bile acids, sapogenins. Specific examples are $5\alpha:6\alpha$-dihydroxycholesterol from cholesterol, epiestriols from estrone.

While various methods are available for the preparation of the lower molecular weight glycols, higher molecular weight glycols, such as the $\alpha$-glycols of 5 to 30 carbon atoms, are more difficultly arrived at. Accordingly, a principal object of the invention is to provide a process for the preparation of higher and lower molecular weight glycols by an economic and commercially feasible process.

Broadly, the present invention is based on the discovery that ammonolysis of chlorohydrin acetates having at least 3 carbon atoms, such as dodecene-1 chlorohydrin acetate, under substantially anhydrous conditions, and preferably in the presence of an inert solvent or diluent such as benzene or o-xylene, yields largely the diols, the yields surprisingly increasing with increasing molecular weight of the chlorohydrin acetate. More particularly, the ammonolysis reaction employed to effect the preparation of the diol is accomplished by heating at a temperature in the range 100° to 250° C. the chlorohydrin acetate of at least 3 carbon atoms with anhydrous ammonia in proportions of at least 2 mols of ammonia for each mol of the chlorohydrin acetate. In general, temperatures near the lower end of the specified range can be employed with the lower molecular weight chlorohydrin acetates, while higher temperatures are conveniently employed with the higher molecular weight materials. The upper limit with respect to the amount of ammonia is not critical, it being governed by operating and practical considerations; an upper limit of about 50 mols anhydrous ammonia per mol of the chlorohydrin acetate can, however, be cited as a feasible upper limit. As solvents or diluents, in addition to the benzene and o-xylene already specified, can be mentioned other aromatic hydrocarbons, such as toluene or mixed xylenes; aliphatic hydrocarbons, such as heptane, isooctane, nonane, kerosene; aromatic and aliphatic compounds which are inert under the reaction conditions, e.g., diphenylether.

The function of the solvent is to solubilize the chlorohydrin acetate and insolubilize the ammonia, such that the concentration of ammonia contacting the chlorohydrin acetate is minimal. As the molecular weight of the chlorohydrin acetate increases, the solubility of the chlorohydrin acetate in ammonia decreases. Therefore, the use of solvent for the higher molecular weight chlorohydrin acetates, and the amount of the solvent therefor becomes less significant.

While a solvent or diluent for the reactants is not absolutely essential, it is preferred to use a diluent or solvent, such as benzene or o-xylene. As will occur to those skilled in the art, the upper limit of solvent amount is not critical, and an upper limit by volume of 100 parts of solvent for each part of chlorohydrin acetate can be cited as illustrative; a more practical range resides in the range 10 to 50 parts of solvent for each part of chlorohydrin acetate.

As is known in the art, the chlorohydrin acetate employed in accordance with the invention can be derived from several sources. Examples include the reduction, followed by acetylation, of $\alpha$-chloroketones and treatment of epoxides with hydrochloric acid followed by acetylation.

However, an especially advantageous method for the preparation of the chlorohydrin acetate is chloroacetoxylation of olefins, more particularly described below. These olefins may be of straight chain structure, such as 1-octadecene to produce 1,2-octadecane diol, and of 3-hexene to produce 3,4-hexane diol; or of branched chain structure, such as the chlorohydrin acetate of alpha-diisobutylene to produce 2,4,4-trimethyl-1,2-pentane diol. As indicated, the unsaturated bond can appear not only at the end of the chain, but internally, that is between carbon atoms intermediate the terminal carbon atoms, for example, to produce 6-chloro-7-acetoxydodecane, whereby 6,7-dodecane glycol is obtained. It is likewise immaterial where the chlorine and acetate radicals appear with respect to each other; for example, the chlorohydrin acetate can be a 1-chloro-2-acetoxyalkane or a 1-acetoxy-2-chloroalkane. Moreover, the chlorohydrin acetate can be derived from the cycloalkenes and their substituted compounds, such as cyclohexene to give cis-dihydroxycyclohexane, cholest-2-ene to give cholestane-cis-2,3-diol and $\Delta^2$-$5\alpha$:$22\alpha$-spirostene to give $5\alpha$:$22\alpha$-spirostane-cis-2,3-diol. With these cyclic chlorohydrin acetates, wherein the chloro and acetoxy functions are in trans position, the hydroxyl groups of the resulting diol product are in cis relationship. Thus, since chlorohydrination followed by acetylation gives predominantly a trans-chlorohydrin acetate, a convenient method is provided for producing cis-diols. As will be apparent to those skilled in the art, a particular advantage of this invention, as applied to cyclic compounds, is the preparation of cis-glycols by a relatively simple, straightforward process. Cis-diols are normally prepared by direct hydroxylation of olefins with aqueous alkaline permanganate or osmium tetroxide. Both of these methods are more expensive and give lower yield than the process described herein. Furthermore, osmium tetroxide is very toxic and must be handled with extreme care.

Because of their ready availability, the invention has particular applicability to the chlorohydrin acetates of acyclic 1-olefins or terminal olefins advantageously obtained from the cracking of petroleum wax.

The chlorohydrin acetate of the olefin can be prepared in known fashion, such as by reaction of equimolar quantities of chlorohydrin and acetic anhydride, catalyzed by a small amount of concentrated sulfuric acid, after reaction the acid being neutralized and the product recovered, as by distillation.

Another way of preparing the chlorohydrin acetates is in accordance with the process set forth in application, Serial No. 722,995, now U.S. Patent No. 2,971,989, issued February 14, 1961, entitled "Production of Alpha-Glycols," filed March 21, 1958, in the names of Seymour J. Lapporte and William A. Sweeney, to which this application has particular applicability. In accordance with this application, chlorohydrin acetates are prepared by reacting appropriate olefins with chlorine in the presence of an acetate ion-donating medium, e.g., sodium acetate, under chloracetoxylation conditions. More particularly, in accordance with the aforesaid Lapporte and Sweeney application, chlorination of the olefin can be effected by contacting under chlorination temperatures olefin and chlorine in stoichiometric amounts, the olefin being dissolved in an acetate ion-donating medium, e.g., acetic acid, in an amount of 0.01 to 0.10 mol of olefin per mol of acetic acid, which may be anhydrous or aqueous, i.e., containing 20% water, a satisfactory chlorination temperature range moreover being 10–30° C. The chloracetoxylation products resulting from the chlorination step, including the olefin dichloride, the chlorohydrin acetate and the diacetate, are then subjected to a hydrolysis step in a confined zone and heated to an elevated temperature in the presence of an organic solvent and an acetate salt to produce glycols.

The present invention can be applied to the chloracetoxylated products produced as above described, replacing the hydrolysis step with the ammonolysis procedure herein contemplated. Accordingly, since the ammonolysis reaction, when proceeding in accordance with the present invention, is carried out under water-free conditions, the acetoxylation agent employed, that is, acetic acid, is preferably free from water, and for this reason, acetic anhydride is preferably employed as the acetoxylation agent. In the event it is desired to employ aqueous acetic acid in the chloracetoxylation step, then its removal prior to the ammonolysis step can simply be effected, as by distillation. Further, prior to the ammonolysis step, it is preferred to remove any unreacted acetoxylation agent, e.g., acetic anhydride and acetic acid, thus obviating the necessity of first having to neutralize it with the ammonia of the ammonolysis step. As with the case of the removal of water, the acetic anhydride can also simply be removed by distillation.

Following ammonolysis of chlorohydrin acetate, whether in pure form or in crude mixture as hereinbefore described, the finished glycol is recovered by conventional means. That is, the ammonolysis products, after removal of any solvent, are neutralized or acidified with a suitable acid, e.g., hydrochloric acid, to separate basic side products, e.g., aminoalcohols, an excess of acid preferably being employed to provide a pH of the ammonolysis mixture in the range 2–5. After neutralization or acidification, the mixture is extracted with a suitable solvent, e.g., chloroform, to separate the neutral organic material. The chloroform is then removed from the extract, as by distillation, and the residue distilled or crystallized from a suitable solvent, e.g., chloroform or pentane. In the case of the lower glycols, i.e., those having less than about 12 carbon atoms, purification of the glycols can be simply effected by crystallization or distillation, whereas with the higher glycols, it is advantageous to recrystallize from a suitable solvent, e.g., pentane, petroleum ether or acetone.

The following examples illustrate the practice of the invention:

*Example 1*

Dodecene-1-chlorohydrin acetate 5.20 g. (0.025 mole), boiling point 123–127.5° C. at 1.1 mm., was placed in a 200-ml. stainless steel rocker bomb with 40 g. of purified orthoxylene. The bomb was charged with 8.5 g. (0.5 mole) of anhydrous ammonia and heated for three hours at 220° C. The maximum pressure was 460 p.s.i.g. The bomb was cooled, vented, and the orthoxylene solvent removed by distillation. The distillation bottoms were taken up in 50 ml. of 10 volume percent aqueous hydrochloric acid and continuously extracted with 150 ml. of chloroform for eight hours. Removal of the chloroform followed by crystallization of the residue from pentane gave 1.3 g. of 1,2-dodecane diol, melting point 59.8–61° C. *Analysis.*—Found: C, 71.11; H, 13.03. Calculated for $C_{12}H_{26}O_2$: C, 71.23; H, 12.96. Infrared spectra of the mother liquors indicated them to be mainly unreacted chlorohydrin acetate. No amino alcohols were detected in the aqueous acid extracts. The 1.3 g. of glycol corresponds to a 100% yield at 33% conversion.

*Example 2*

A 600-ml. stainless steel rocker bomb was charged with 10.24 g. (0.075 mole) of propylene chlorohydrin acetate, boiling point 152.9–153.4° C., $N_D^{20}=1.4220$, 135 g. distilled orthoxylene, and 31.9 g. (1.875 moles) of anhydrous ammonia, and heated at 220° C for three hours. The maximum pressure was 675 p.s.i.g. The bomb was cooled, vented, and contents continuously extracted with 400 ml. of 2% aqueous caustic for eight hours. Analysis of the aqueous extract indicated a 63% yield of aminoalcohols, the balance 37% being propylene glycol.

*Example 3*

A 600-ml. stainless steel rocker bomb was charged with 8.84 g. (0.05 mole) of trans-2-chloro-cyclohexyl acetate, B.P. 100–100.2% C./12 mm., $N_D^{20}=1.4644$, 100 ml. of distilled orthoxylene, B.P. 145.5° C., 21.25 g. (1.25 moles) of anhydrous ammonia and heated at 220° C. for four hours. The maximum pressure was 530 p.s.i.g. The bomb was cooled, vented, and the orthoxylene solvent removed by distillation. The residue, which partly solidified was taken up in 25 ml. of 10 volume percent aqueous hydrochloric acid and continuously extracted for eight hours with 75 ml of chloroform. The chloroform extract was separated and the solvent removed. A total of 4.46 g. (77% yield at 100% conversion) of cis-cyclohexane-1,2-diol was recovered. Recrystallization from chloroform afforded 3.53 g. of pure cis-glycol, identified by its melting point and infrared spectrum. No trans-cyclohexane-1,2-diol was detected.

This application is a continuation-in-part of application Serial No. 49,414, filed August 15, 1960, and now abandoned.

I claim:

1. Process for the preparation of a vicinal glycol of 3–30 carbon atoms and consisting of carbon, hydrogen and oxygen, which comprises heating at a temperature in the range 100° to 250° C., materials consisting essentially of the corresponding chlorohydrin acetate and anhydrous ammonia in proportions of at least 2 mols of the ammonia for each mol of the chlorohydrin acetate.

2. Process according to claim 1, wherein the chlorohydrin acetate and ammonia are heated in the presence of an inert diluent selected from the group consisting of benzene, o-xylene, toluene, mixed xylenes, heptane, isooctane, nonane, kerosene, and diphenylether.

3. Process according to claim 2, wherein the chlorohydrin acetate is selected from the group consisting of cyclic and acyclic chlorohydrin acetates.

References Cited by the Examiner

UNITED STATES PATENTS 2,971,989   2/1961   Lapporte et al. _____ 260—636

OTHER REFERENCES

Bodendorf et al.: Chem. Abstract, vol. 52 (1958), pp. 14562–63.

McKelvey et al.: Jour. Organic Chem., 25: 1424–28 (August 1960) (5 pages).

LEON ZITVER, *Primary Examiner.*

CHARLES B. PARKER, *Examiners.*